Figure 1:
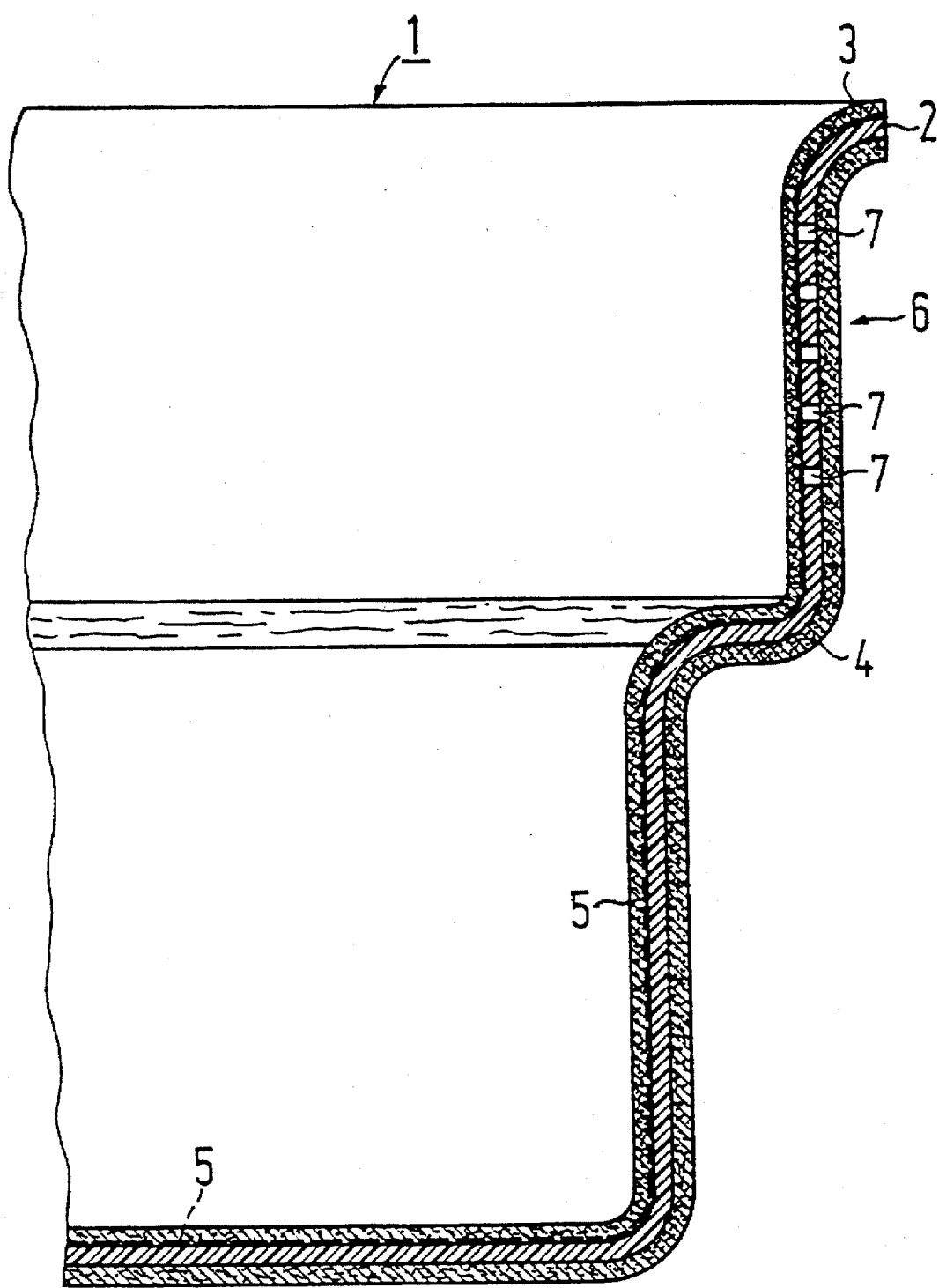

United States Patent [19]
Stricker et al.

[11] Patent Number: 5,670,235
[45] Date of Patent: Sep. 23, 1997

[54] SHAPED LAMINATE, PARTICULARLY INTERNAL LINING PART FOR MOTOR VEHICLES, AS WELL AS PROCESS AND APPARATUS FOR THE PRODUCTION THEREOF

[75] Inventors: Klaus Stricker, Bietigheim-Bissingen; Rolf Maysenhoelder, Besigheim; Dieter W. Hess, Bietigheim-Bissingen, all of Germany

[73] Assignee: Georg NaherGmbH, Markgroeningen, Germany

[21] Appl. No.: 650,440

[22] Filed: May 20, 1996

Related U.S. Application Data

[63] Continuation of Ser. No. 234,918, Apr. 28, 1994, abandoned.

[30] Foreign Application Priority Data

Apr. 28, 1993 [DE] Germany .................. 43 13 911.6

[51] Int. Cl.⁶ ........................................ B32B 3/10
[52] U.S. Cl. .............. 428/138; 428/245; 428/265; 428/483; 428/517
[58] Field of Search ...................... 428/138, 245, 428/265, 483, 517

[56] References Cited

U.S. PATENT DOCUMENTS

| | | |
|---|---|---|
| 2,455,926 | 2/1948 | Gessler et al. . |
| 4,128,683 | 12/1978 | Nomura et al. ............ 428/138 |

FOREIGN PATENT DOCUMENTS

| | | |
|---|---|---|
| 0 403 187 | 12/1990 | European Pat. Off. . |
| 0 453 877 | 10/1991 | European Pat. Off. . |
| 27 06 446 | 11/1977 | Germany . |
| 27 27 285 | 1/1978 | Germany . |
| 30 09 334 | 9/1980 | Germany . |
| 34 17 729 | 11/1985 | Germany . |
| 37 22 873 | 4/1989 | Germany . |
| 89 09 952 | 8/1989 | Germany . |
| 89 09 852.4 | 10/1989 | Germany . |
| 39 19 166 | 12/1990 | Germany . |
| 41 26 884 | 2/1993 | Germany . |
| 41 33 634 | 4/1993 | Germany . |
| 42 11 708 | 10/1993 | Germany . |
| 42 14 389 | 11/1993 | Germany . |
| 865 682 | 9/1981 | U.S.S.R. . |
| 1139639 | 2/1985 | U.S.S.R. . |
| 1692864 | 11/1991 | U.S.S.R. . |

*Primary Examiner*—Mark D. Sweet
*Attorney, Agent, or Firm*—Gary M. Nath; Nath & Associates

[57] ABSTRACT

The invention relates to a shaped laminate, particularly an internal lining part for motor vehicles. The laminate (1) has a substantially stiff supporting sheet (2) of thermoplastic material. The latter is covered on at least one and preferably both sides with a surface layer (3, 4) in the form of a nonwoven fabric. The joint between the nonwoven fabric and the plastic sheet is a thermal bond. For forming the bond the nonwoven fabric at least partly and preferably completely is made from the same type of plastic as the sheet. The invention also relates to a process and an apparatus for producing the laminate. For forming the adhesive joint the sheet is heated on at least one side to a temperature in the adhesive range of the thermoplastic material, the sheet interior being kept at a lower temperature. As a result of this procedure the nonwoven fabric structure is protected during the adhesion and shaping process. The invention makes it possible in simple manner to produce type-pure laminates, so that they can be recycled again as a whole, as can the waste material produced during their production.

24 Claims, 2 Drawing Sheets

SHAPED LAMINATE, PARTICULARLY INTERNAL LINING PART FOR MOTOR VEHICLES, AS WELL AS PROCESS AND APPARATUS FOR THE PRODUCTION THEREOF

This application is a Continuation of U.S. patent application Ser. No. 08/234,918, filed Apr. 28, 1994, now abandoned.

The invention relates to a shaped laminate, particularly an internal lining part for motor vehicles, having a support layer made from a stiff sheet of a thermoplastic material and at least one surface layer of a textile fabric, as well as to a process and an apparatus for the production thereof.

Internal lining parts for motor vehicles frequently comprise a laminate, which is shaped in accordance with the walls of the inner area and has on its side facing the latter a textile fabric, particularly in the form of a needle web. For the production of such internal lining parts thermoplastics, particularly polypropylene are extruded to sheets and onto the hot sheet is directly laminated the textile fabric, the fibres of the needle web being pressed into the still soft mass of the sheet and are embedded therein. It is standard practice for the needle web serving as the surface layer to be made from a material, which does not melt at the extrusion temperature, which is approximately 240° C. in the case of polypropylene, because otherwise the needle web structure would be destroyed.

Attempts have already been made to laminate polypropylene needle webs onto extruded polypropylene sheets, leading to a welded joint between the sheet and the web, but this has led to significant structural changes to the web, because the fibres begin to melt and lose strength.

The problem of the invention is to improve a shaped laminate and its production and in particular so as to permit an environmentally friendly structure of a high quality laminate and extend the design possibilities during its production.

The invention is characterized in that fibres of at least one surface layer at least partly comprise a thermoplastic material of substantially the same type as the sheet and the surface layer is joined to the sheet by thermal bonding of said fibres.

As opposed to the mere embedding of fibres of unmeltable material or thermoplastics, whose softening range is below the extrusion temperature of the sheet, according to the invention the joint between the textile surface layer and the sheet is constructed as a bond, in which the fibrous material of the textile surface layer is adhesively connected to the thermoplastic material of the sheet by means of common interfaces. This ensures a good joint without any additional adhesives being necessary.

Whereas in the case of the aforementioned welded joint the phase boundaries between the sheet material and the layer material are dissolved and the fibres of the textile layer in the sheet-near area thereof liquefy on melting, in the case of the bond according to the invention the phase boundaries between the sheet material and the fibrous material are largely retained. The fibres are deformed and sintered together in the sheet-near area. In the sintered area the fibrous structure is compressed, so that a fibre union is formed, which is bonded to the sheet surface, optionally accompanied by the formation of impressions or depressions in the sheet surface. The fibre cross-section and the interfaces of the fibres are largely retained, even in the sheet-near area. Directly alongside the same the structure of the textile fabric is unchanged, i.e. has remained in its original form.

The thickness of the compressed or sintered area of the fibres is approximately 1 to 10 times and in particular approximately 1 to 5 times the fibre thickness. There are three surface zones of the sheet between individual bond points.

Thermoplastic materials of the same type are understood to mean plastics, which are the same or substantially the same as the plastics of the sheet or different therefrom, but in which the softening and tackiness range is roughly at the same temperature level, so that they can be thermally bonded together and are able to form a common melt during recycling. The textile surface layer is in per se known manner preferably a non-woven fabric, preference being given to those fabrics which are free from a textile support. The laminate is generally a three-dimensionally shaped laminate, which has acquired its three-dimensional structure from the original plane of the sheet by the shaping of the latter. The laminate is preferably a trunk internal lining. The surface layer is appropriately constructed as a surface decoration. According to a preferred embodiment of the invention the laminate is provided on both sides, i.e. two surface layers and once can serve as a decorative layer and the other as a backing. One surface layer can be constructed as a sound-absorbing backing. The second surface layer or the backing is preferably also formed by a nonwoven fabric, particularly a needle web.

The thermoplastic material of the sheet is in per se known manner preferably a polyolefin, particularly a polypropylene. Polypropylene has satisfactory mechanical characteristics and is suitable for recycling. Preferably at least one surface layer and in particular the decorative layer is completely made from substantially the same material as the sheet, especially polypropylene. It is preferred according to the invention to give the laminate a type-pure structure or at least form it from those materials which can be jointly recycled. A support sheet made from polypropylene and at least one surface layer of polypropylene fibres constitutes such a type-pure structure.

It is also possible, if desired, for at least one surface layer, particularly a backing layer, to be partly and in particular largely formed from fibres, which are not bondable with the sheet material, the layer, for forming the adhesive bond, having a fibre proportion appropriate for fusing with the thermoplastic material of the sheet. Such a surface layer can e.g. be a needle web, which is produced from waste materials from the textile industry, particularly using cotton and/or acrylic fibres. The nonwoven fabric has a minimum proportion of fibres from a plastics material, which is thermally bondable with the sheet material, the union between the nonwoven and the sheet being obtained by bonding said fibres to said sheet. The content of fibres from a material which is thermally bondable to the sheet material is generally at least 10% by weight and is preferably approximately 20% by weight or more. The proportion of said fibres is preferably uniformly distributed within the nonwoven. It is also possible to increase the proportion of fibres bondable with the sheet on the nonwoven side facing the sheet. In such cases weight proportions of fibres from the material bondable with the sheet of approximately 5% are adequate.

Particularly when the laminate is constructed as a trunk internal lining its production involves a high proportion of waste caused by the cutting operations. The waste proportion can be approximately 50%. According to the invention, said waste is recycled during laminate production. It is therefore particularly preferred if the laminate has a type-pure structure or is at least made from those materials able to form a common melt, because it is then particularly simple to disintegrate the waste and return same to the extruder for the production of the sheet. It has surprisingly been found that a limited proportion of extraneous fibres, which are not present in the melted state at the melting temperature of the sheet material is not prejudicial. In the case of a correspondingly fine disintegration of said fibrous proportion during the disintegration of the waste, said fibrous proportion can be concomitantly processed in the extruder and serves as a fibre reinforcement for the sheet. Larger extraneous fibre quantities are preferably removed from the sheet prior to recycling.

In a preferred embodiment of the invention at least one side of the sheet is covered in full-surface manner with an open-cell or pore layer of a thin web material, which is shaped in accordance with the sheet and at least one surface layer. The pores of the web material are preferably so wide and the web material layer thickness so thin that the adhesive bond between the sheet and the surface layers penetrates the pores. As a result, the web material, whose significance will be described hereinafter, does not impair the union between the surface layer and the sheet, if the web material layer is located between the surface layer and the sheet. The web material is preferably in the form of a very thin nonwoven constituting a fibrewoven fabric, in which the fibres are located in the web material plane. The web material is preferably a spunbonded fabric. The web material layer weight is very low, generally between 10 and 50 g/m$^2$, particularly at approximately 30 g/m$^2$. According to an embodiment of the invention the web material is formed by a hidden supporting web, which remains in the laminate.

In a preferred embodiment of the invention the support sheet is at least zonely provided with perforations. These perforations are preferably used for sound absorbtion purposes and can also have a ventilating function. At least one surface layer and in particular a visible decorative layer is advantageously free from perforations, i.e. it covers the perforations of the sheet, so that they are not visible from the outside. If there are surface layers on both sides of the sheet, then preferably both surface layers are free from such perforations. At least part of the perforations can be deformed as a function of the deformation of the sheet. This is the case if the surface areas in which the perforations are located are provided at those points, which are stretched during the shaping of the sheet, particularly during a subsequently described deep drawing process. The perforated surface areas are advantageously limited to those points of the laminate, which are used for covering low-noise areas of a motor vehicle. In this way it is ensured that the noise to be destroyed by the perforations penetrates the low-noise areas behind the same and is consequently absorbed. The perforations can have a cross-sectional surface of 0.5 to 5 mm$^2$. Based on the surface of the perforated areas, the proportion of holes can be approximately 0.3 to 8%, particularly 1 to 6%. The individual perforations can have random shapes, but are preferably circular. Their internal diameter can be in the range 1 to 3 mm, preferably approximately 1.5 mm. The spacing of the holes can be adapted to the acoustic conditions and is generally between 0.5 and 3 cm, particularly between 0.7 and 1.5 cm (distance between the hole centres).

As mentioned hereinbefore, the surface layer serving as the backing can advantageously be used for sound absorbtion or insulation purposes. Therefore the backing advantageously has a greater material thickness than the decorative layer. The backing generally has a full-surface construction. At points where particular sound absorbtion is important it can be reinforced by separate added coatings. This is advantageously the case at points where there are larger openings in the outer surface of the vehicle body and which are used for the now standard forced ventilation of a vehicle interior through the trunk area.

The invention also relates to a process for the production of a shaped laminate with a support layer of a substantially stiff sheet of thermoplastic material and at least one textile surface layer by connecting and shaping at elevated temperature. This process is characterized in that a thermoplastic material sheet, which on at least one surface has a temperature in the melting range and in the interior a lower temperature close to the plastic deformability range, is connected by thermal bonding to at least one textile surface layer, the temperature level in the interior being utilized for the deformation or shaping of the sheet.

It has been found that a particularly careful and material-compatible adhesive joint for the textile surface layer is obtained if instead of the entire sheet, only its surface areas to be bonded with the textile surface layer are at a temperature level suitable for the adhesive connection, whereas the sheet core and optionally a surface which is not to be coated are preferably at a lower temperature level. This avoids an overheating of the surface layer and consequently undesired damage thereto. It is simultaneously ensured that an undesired post-curing from the inside is unnecessary and the cooling time for the laminate in the deforming apparatus is relatively short. In addition, due to the lower temperature level in the sheet core, the sheet is still relatively stable, so that undesired deformations prior to the actual shaping process can be prevented with technically simple means.

During the bonding of the surface to the surface layer, the sheet interior or sheet core is preferably at a temperature level corresponding to the shaping temperature of the thermoplastic material. Particularly in the case of thermoplastics having a crystalline proportion, the shaping temperature is at the transition from the crystalline into the amorphous range.

The temperature variation can be obtained in that at least one surface of a firm sheet, particularly a sheet web of a thermoplastic material is brought by surface heating to a surface temperature in the tackiness range of the thermoplastic material, so that the temperature in the interior of the sheet does not exceed the temperature required for the plastic deformation of the sheet. Surface heating advantageously takes place by infrared radiation. If only one side of the sheet is to be joined to the surface layer, then heating only takes place on one side. Preferably this one-sided heating is combined with a simultaneous cooling of the other side, a cooling with cold gases, particularly cold air being preferred. The thermoplastic material of the sheet can contain conventional fillers.

According to the invention it is also possible for a sheet, which is already provided with a surface coating, to be subsequently joined on the other side to a second surface coating, in that the side of the coated sheet provided for the adhesive bond is heated and the coated side is preferably simultaneously cooled.

The surface layers to be joined at the time of application are advantageously at ambient temperature, i.e. they are brought onto the sheet to be coated without prior heating. This is particularly advantageous if the surface coating is entirely made from the same material as the sheet. Through the cold supply of the surface coating, e.g. in the form of a needle web, the structure thereof is maintained.

The connection between the at least one surface layer and the sheet can take place before, during or after shaping the sheet and is appropriately carried out at the latest during the shaping of the laminate. Preferably the adhesive joint is partly or completely formed when the individual coatings of the laminates have not yet undergone shaping. The connection is preferably carried out following onto the heating of the sheet, in that the individual coatings are brought together under moderate pressure, e.g. are jointly passed through a pair of rollers or through clamping beams. A performance of the adhesive connections separate from the actual shaping process also makes it possible to regulate the contact pressure separately from said shaping process and directly utilize the temperature level of the surface coating of the heated sheet for the adhesive joint, so that there is no need to heat to a higher temperature than is actually necessary.

The actual shaping in the three-dimensional body advantageously takes place in per se known manner rising a drawing or extrusion press having a male mould and a female mould, the entire shaping process being performed in one step. The press moulds are appropriately thermostatically controlled at a temperature below the hardening range of the thermoplastic material of the sheet. The shaped laminate is kept between the moulds until the plastic of the sheet has solidified to such an extent that an undesired, subsequent deformation of the laminate following mould release is avoided. Preferably the moulds are thermostatically controlled by a sole to a temperature of −3° C. and the mould surface temperature is advantageously approximately +5° C. The shaping process between the moulds is performed discontinuously, i.e. stepwise. The individual coatings or layers which are brought together and which jointly form the laminate can be drawn stepwise from delivery rolls, particularly as the heating of the supporting web advantageously also takes place stepwise. It is also possible to continuously shape the plastic sheet from an extruder slot die, allow it to cool and then pass the sheet web in the form of a continuous web up to the press and between the extruder and the heating zone is preferably incorporated a levelling loop or the like, in order to bring about a levelling between the continuous extrusion and the stepwise shaping process.

During the heating process the sheet is preferably held on a supporting web, which prevents an undesired deformation of said web in the heated state. It has proved particularly advantageous to construct said supporting web as a so-called hidden support, which remains as an additional layer in the shaped laminate. To this end the supporting web is preferably constructed in such a way that it has the necessary tensile strength required in order to prevent an undesired deformation of the softened sheet due to its own weight, the tensile strength of the supporting web also being limited, so that the three-dimensional shaping during swaging is not prevented, i.e. the structure of the supporting web during swaging gives way and takes part in the drawing path of the sheet during pressing without cutting into the same. The supporting web is laminated onto the sheet, provided that when the latter leaves the extruder slot die it is still hot enough in order to permit an anchoring of the supporting web with the sheet. It has proved advantageous to make the supporting web from a material which is stable at the temperature at which the sheet material leaves the extruder. In the case of a polypropylene sheet material the exit temperature is approximately 240° C. and rapid cooling takes place. A supporting web made from textile fibres is particularly suitable, polyester fibres being preferred, which are still adequately stable at the softening point of polypropylene.

The supporting web preferably has an open structure, which is particularly advantageous if the sheet side covered with the said web is to be provided with a surface layer. The pore size or the open structure is advantageously such that it is possible for an adhesive joint to be formed between the fibres of the surface material and the thermoplastic material of the sheet, without impediment, through the supporting web pores. The supporting web preferably is kept very thin, which also has a positive effect on the good connection between the surface layer and the sheet. Particularly suitable for a supporting web is a spun bonded fabric, i.e. a nonwoven, in which the fibres are located in the plane of the fabric. Supporting webs with a layer weight of 10 to 50 g/m$^2$ and in particular 20 to 40 g/m$^2$ are especially preferred. The supporting web thickness is preferably approximately 1 to 5 times the fibre thickness.

During the heating process the sheet is preferably guided and/or held on its longitudinal edges. This can e.g. take place in such a way that the longitudinal edges are tensioned or hung in spiked chains. This also covers the supporting web. However, the surface layers which are to be supplied to the hot sheet are preferably kept narrower, so that they do not cover the marginal area of the sheet, which is trimmed.

If the sheet is to have perforations, then the corresponding holes are preferably made while the sheet is in a solid state, i.e. after hardening following production by extrusion and before heating takes place. The perforations can be made with perforating or spiked rollers. The perforations can be made over the entire surface area of the sheet or, if desired, to acoustically preferred areas. If the holes are in areas which are drawn during the deep drawing process, then the holes are correspondingly deformed, i.e. they are generally enlarged in at least one direction. This is taken into account when dimensioning the size of the holes when the perforations are made on the cold sheet.

In the unshaped state the plastic sheet advantageously has a weight per unit area or layer weight of 500 to 3000 g/m$^2$, particularly 900 to 1600 g/m$^2$. A textile surface layer, which is to be used as a decorative layer, generally has a weight per unit area of 100 to 600 g/m$^2$, particularly 200 to 350 g/m$^2$. A surface layer to be used for sound absorbtion purposes has, as a function of the desired sound absorbtion and when used on the back preferably a higher weight per unit area, which can be up to 1500 g/m$^2$ or more.

For sound absorbtion purposes it is advantageous to use textile needle webs, which are produced from waste fibres from the clothing industry and for the preferred formation of the bonded joint, also in the damping or absorbing layer there is a minimum proportion of fibres usable with the sheet material.

If the sheet is made from polypropylene, then the heating of the sheet is preferably controlled in such a way that the sheet surface reaches a temperature of approximately 180° C., said temperature being measured with a radiation pyrometer. At this surface temperature the polypropylene is sufficiently tacky in order to form a thermoplastic bond with the fibres of the surface layer, which are made from the same type or an identical material. The core temperature of the sheet is preferably kept in the range 140° to 160° C. and corresponds to the shaping range of the polypropylene with plastic deformability, a minimum strength being maintained. Due to the fact that, according to the process of the invention, there is a core temperature in the deformation range and a surface temperature in the tackiness range, a good bond can be obtained between the sheet and the textile surface layer, the adhesion process, due to the limitation of the thermal energy of the sheet, having no disadvantageous effect on the structure of the surface layer and the thermal energy present in the sheet is sufficient in order to simultaneously utilize it for the production of the laminate by deformation.

The apparatus according to the invention for producing the laminate has a heating device for the sheet, a device for bringing together the at least one surface layer and the sheet, as well as a shaping device. These devices are preferably arranged in substantially directly succeeding manner along the sheet conveying path. If only one side of the sheet is to be welded to a surface layer, the heating device preferably has a cooling device for cooling the other side of the sheet.

Further features of the invention can be gathered from the following description of preferred embodiments, in conjunction with the drawings and subclaims. The individual features, either singly or in the form of random combinations, can be implemented in an embodiment of the invention. In the drawings show:

FIG. 1 A partial cross-section through a laminate according to the invention.

Figure 2:
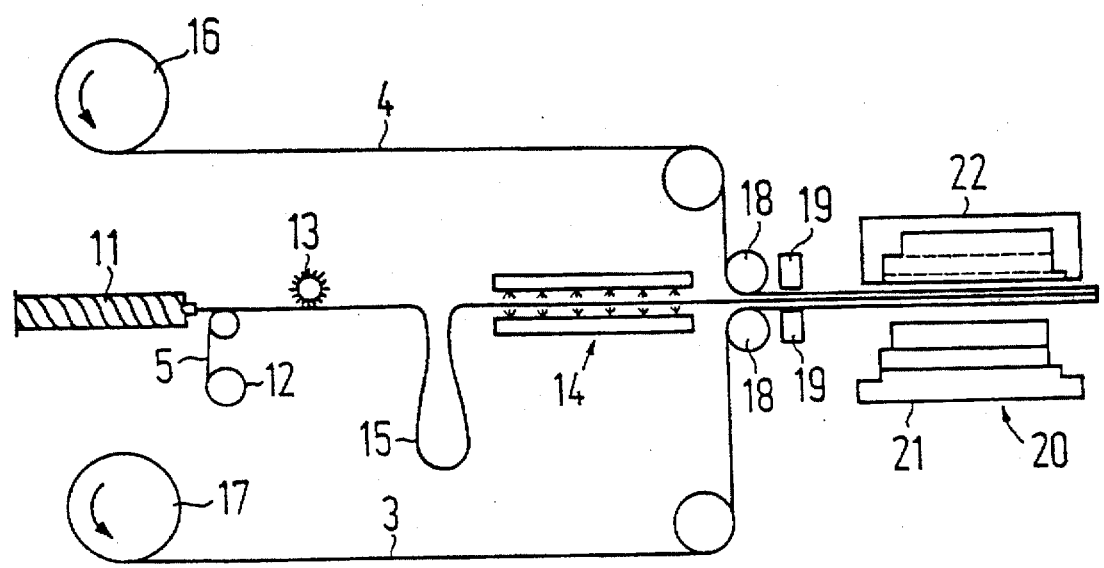

FIG. 2 A diagrammatic representation of the procedure and the apparatus for producing the laminate.

Figure 3:
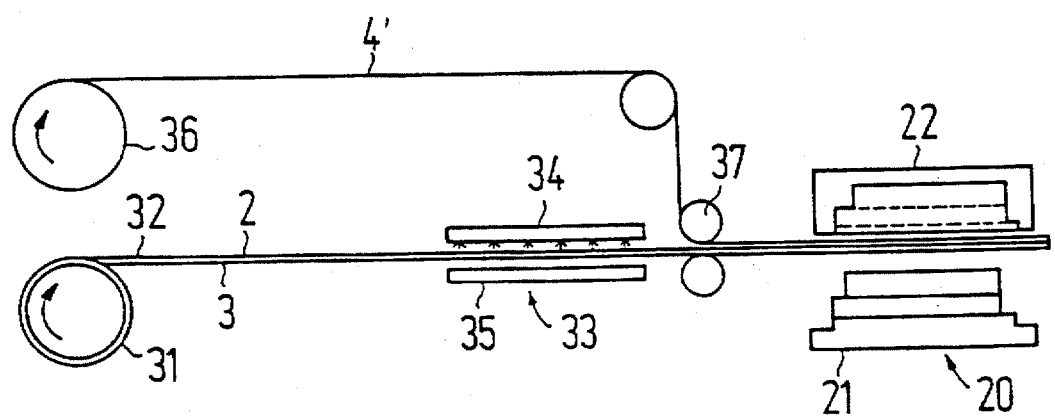

FIG. 3 Another embodiment of the procedure and the apparatus for producing the laminate.

In the embodiment of the invention shown in FIG. 1 there is a trunk inner lining in the form of a laminate 1 and which has been built up from three layers. A support layer 2 of a polypropylene sheet has been shaped by thermal deformation from a flat material and has been adapted to the shape of a trunk, so that a three-dimensional laminate has been formed. On both sides the support layer 2 has been coated with a textile needle web as a surface layer. A surface layer 3 is constructed as a decorative layer, whereas the surface layer provided on the not visible side of the trunk inner lining is constructed as a backing 4 and is used for sound absorbtion purposes. Between the decorative layer 3 and the support layer 2 there is a very thin intermediate layer 5, which is provided with perforations and is formed by a hidden supporting web. Both the decorative layer 3 and the backing 4 are made from a polypropylene fibre needle web. The layer weight of the needle web of the decorative layer is approximately 350 g/m$^2$, whereas the layer weight of the backing needle web is roughly twice as high. The two needle webs are joined to the polypropylene sheet by thermal bonding. This means that individual fibres or agglomerated fibres, which are located on the side of the needle fleeces facing the sheet, are sintered to the sheet surface. Thus, there is a very good joint between the three layers, without any additional adhesive being used. The intermediate layer 5 consists of a polyester fabric in the form of a very thin, light fibrewoven fabric with a layer weight of 30 g/m$^2$. This fibrewoven fabric is very thin and has, apart from its relatively large openings, a material thickness of 1 to approximately 5 times the fibre thickness. The proportion of holes or pores in the fibrewoven fabric is approximately 90% or higher. The polypropylene sheet has on non-deformed areas a layer weight of approximately 1600 g/m$^2$. It is correspondingly lower at those points which are stretched during deformation.

Thus, the represented laminate has a substantially type-pure structure. The small proportion of polyester fibres introduced through the supporting web 5 plays no part when the laminate is reprocessed and can be ignored, particularly as the polyester fibres are very thin and are disintegrated during any pelletizing of the laminate on recycling.

The type-pure structure is particularly advantageous if there are large quantities of clippings during laminate production, such as would be the case for a trunk internal lining. Due to the complicated shapes of such trunk internal linings the clippings can be up to 50%. The clippings can be used without difficulty for producing the supporting sheet.

The support layer 2 has in the side wall area 6 of the trunk internal lining perforations 7. These perforations have a diameter of approximately 1 to 2 mm and are spaced from one another by 0.5 to 2 cm, whilst in the areas where the polypropylene sheet is stretched the holes are correspondingly deformed and enlarged as compared with the original circular shape. The intermediate layer 5 is disintegrated in the stretched areas of the sheet, i.e. the fibre structure has been wholly or partly dissolved in these areas. The needle webs of the decorative layer 3 and the backing 4 have fully participated in the deformation of the supporting sheet and are therefore correspondingly stretched at those points where the sheet is stretched, without this being visible on the surface. The perforations provided in the supporting layer are covered and rendered invisible by the decorative layer. Airborne sound which has penetrated the trunk can pass through the perforations 7 into the covered trunk areas located behind the same and is completely deadened therein, so that there is an effective sound absorbtion. Thus, the backing 4 mainly fulfils a sound absorbtion function. At the unperforated points the supporting layer prevents sound, which has penetrated into the vehicle interior from outside through openings in the vehicle body, e.g. at the locations of the forced ventilation system, can penetrate through the trunk internal lining into the interior of the trunk.

It is also possible in individual surface layers to provide only a proportion of fibrous material bondable with the sheet material or to only thermally bond one surface layer to the supporting sheet. However, preferably the proportion of extraneous fibres is kept so low that it is still possible to reutilize the entire laminate through thermoplastic processing.

FIG. 2 diagrammatically shows an apparatus for producing the laminate according to the invention and the operation thereof. The support layer 2 is extruded as an endless web from an extruder 11 and passes out of the not shown slot die of the extruder in the form of a plastic, easily deformable polypropylene continuous web. A web-like fibrewoven fabric is supplied from below from a delivery roll 12 to the said web and forms the supporting web or intermediate layer 5. On bringing together the supporting web and the still hot polypropylene web, the polypropylene fibres of the supporting web are partly embedded in the soft polypropylene. The leads to a good connection between the supporting web and the polypropylene sheet, the fibres of the supporting web not being modified as a result of the thermal stability of the polyester fibres. The resulting polypropylene sheet 2 joined to the supporting web 5 can, after cooling and hardening, be rolled up and intermediately stored. The roll can then serve as a delivery roll during the further processing. However, it is also possible to immediately supply the supporting web to the further processing operations in the manner shown in FIG. 2. The cool supporting web is then provided with perforations by means of a perforating roller 13 and this can also include marginal perforations for retaining the web in a following heating device 14. Upstream of the heating device 14 the supporting layer web is appropriately placed in a levelling loop 15, which levels the transition from the continuous extrusion to the discontinuous heating and shaping.

The heating device 14 operates with infrared lamps and is equipped in the represented embodiment for the surface heating of both sides. In the heating device is heated a web portion, which essentially corresponds to the size of a portion to be used for producing a trunk internal lining. The surface layers, namely the decorative layer 3 and the backing 4, are drawn from delivery rolls 17, 16 and simultaneously combined on both sides with the heated support layer. The combining and joining preferably takes place by means of guide rolls 18, which simultaneously serve as pressure rolls. It is also possible to provide for this purpose additional gripping jaws 19. As a result of the heating process the surfaces of the support layer 2 are heated more than the interior of the sheet. Following the end of the heating process the sheet surface has softened to such an extent that it can be thermoplastically bonded with the polypropylene fibres of the decorative layer 3 and the backing 4. The sheet core is sufficiently firm, that it is able to withstand the contact pressure for joining the three layers. Simultaneously the sheet core is heated to such an extent that its temperature is in the shaping range of the polypropylene, so that the shaping of the still flat laminate can take place directly following the combining of the three layers in a drawing or extruding press 20. The latter has a male mould 21 and a female mould 22, which are thermostatically controlled on a permanent basis and are in particular cooled. The cooling brings about a protection of the needle webs of the surface layers and simultaneously harden the support layer, after the flat laminate has been shaped into a three-dimensional laminate. Marginal trimming of the finished laminate can take place simultaneously with the extrusion pressing or subsequently.

In the case of the embodiment of FIG. 3 a delivery roll 31 is provided and carries a supply of polypropylene sheet, which has already been joined to a surface layer 3 of a decorative web and a supporting web, which subsequently forms the intermediate layer 5. The supporting web is located between the web of the supporting layer 2 and the web of the decorative layer 3. This previously formed laminate 32 is supplied stepwise to a heating/cooling device 33, which has on its surface an infrared heating device 34 for heating the exposed surface of the support layer and on its underside has a cooling device 35 for the simultaneous cooling of the decorative layer 3 on the other side. Heating once again takes place in such a way that the support layer surface intended for the adhesive bond is brought to a temperature of approximately 180° C., whereas the sheet core and the other support layer side does not exceed a temperature in the shaping range of 140° to 160° C. A backing layer 4' is drawn as web material from a delivery roll 36 and is in the form of a needle web, which entirely comprises polypropylene fibres or extraneous fibres and a minimum proportion of polypropylene fibres for the formation of the adhesive bond. The connection of the backing layer 4 to the previously formed laminate 32 takes place, in much the same way as in the embodiment according to FIG. 2, by means of a pair of rollers 37. The shaping of the still flat laminate to a three-dimensional laminate once again takes place by means of an extruding press 20 with a male mould 21 and a female mould 22.

What is claimed is:

1. A shaped laminate suitable for lining a compartment of a motor vehicle, the laminate including a support layer, comprising a substantially stiff extruded sheet of a thermoplastic material and first and second surface layers, respectively, being formed of a textile fabric, wherein fibers of at least one of said surface layers comprises the same thermoplastic material as the sheet, said sheet being joined on at least one side to an open pore layer from a very thin web material, said very thin web material having thickness from about 1 to about 5 times fiber thickness and having a low layer weight between 10 to 50 g/m$^2$ which is shaped in conformance with said sheet, said layer being placed between said surface layer and said sheet, whereby whichever of either surface layer formed of said textile fabric are joined to said sheet by thermal bonding of said fibers to the sheet and whereby the pores of the web material are so wide and the web material layer thickness so thin that the adhesive bond between the sheet and the adjacent surface layer penetrates the pores.

2. A laminate according to claim 1, wherein at least one surface layer is made from substantially the same material as said sheet.

3. A laminate according to claim 1, wherein it is made from materials compatible with one another with respect to recycling.

4. A laminate according to claim 1, wherein the sheet and at least one surface layer are made from thermoplastic polymers, which during the melting of the said sheet are able to form a common melt.

5. A laminate according to claim 1, wherein waste created during production is recyclable.

6. A laminate according to claim 1, wherein at least one layer, is at least partly made from fibers, which are not fusible with the material of said sheet, the layer having a proportion of fibers made from the same type of material as said sheet adequate for thermal bonding.

7. A laminate according to claim 6, wherein said fibers suitable for thermal bonding said sheet are present in greater numbers in a side of said layer facing said sheet.

8. A laminate according to claim 1, wherein said layer of said web material is placed between said surface layer, and said sheet.

9. A laminate according to claim 8, wherein the web material layer is so thin and the pore size so large that the adhesive joint between the sheet and the surface layer penetrates the pores of the layer.

10. A laminate according to claim 9, wherein the web material is formed by a hidden supporting web, which remains in the laminate.

11. A laminate according to claim 1, wherein the sheet has perforations at least on surface areas.

12. A laminate according to claim 11, wherein at least one surface layer is free from perforations and covers the perforations of the sheet.

13. A laminate according to claim 11, wherein the perforations are deformed as a function of the deformation of the sheet.

14. A laminate according to claim 11, wherein the perforations are provided in those areas of the sheet, which cover cavities suitable for sound absorption.

15. A shaped laminate according to claim 1, wherein it is an internal lining part for motor vehicles.

16. A laminate according to claim 1, wherein at least one decorative surface layer is made from substantially the same material as said sheet.

17. A laminate according to claim 1, wherein at least one surface layer is made substantially of the same material as said sheet which is made form polypropylene.

18. A laminate according to claim 1, wherein said sheet and at least one surface layer are made from thermoplastic polymers, which during the melting of said sheet during recycling thereof are able to form a common melt.

19. A laminate according to claim 1, wherein at least a layer is at least partly made form fibers, which are not fusible with the material of said sheet, the layer having a proportion of fibers made form the same type of material as said sheet adequate for thermal bonding.

20. A laminate according to claim 1, wherein at least one layer is mainly made form fibers, which are not fusible with the material of said sheet, the layer having a proportion of fibers made from the same type of material as said sheet adequate for thermal bonding.

21. A laminate according to claim 1, wherein said sheet is joined on at least one side to an open-port intermediate layer from a web material which is shaped in accordance with said sheet.

22. A shaped laminate according to claim 1, wherein at least one surface layer is at least partially formed of the same type of plastic as said support layer.

23. A shaped laminate according to claim 1, wherein said support layer first side is heated and said second side is simultaneously cooled.

24. A shaped laminate according to claim 1, wherein said support layer is zonally perforated and said perforations undergo a shape change as a function of the material flow of said support layer during shaping.

* * * * *